US008542417B2

(12) United States Patent
Nagami

(10) Patent No.: US 8,542,417 B2
(45) Date of Patent: Sep. 24, 2013

(54) IMAGE READING APPARATUS HAVING READING UNITS AND PROCESSING UNITS

(75) Inventor: Masahiro Nagami, Anjo (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 181 days.

(21) Appl. No.: 13/050,316

(22) Filed: Mar. 17, 2011

(65) Prior Publication Data
US 2011/0235138 A1   Sep. 29, 2011

(30) Foreign Application Priority Data

Mar. 25, 2010   (JP) ................. 2010-070636

(51) Int. Cl.
  *H04N 1/04*   (2006.01)
(52) U.S. Cl.
  USPC ............................ 358/498; 358/1.9; 358/1.15
(58) Field of Classification Search
  USPC ................................................. 358/1.1–3.29
  See application file for complete search history.

(56) References Cited

U.S. PATENT DOCUMENTS

2004/0212846 A1* 10/2004 Baunach et al. .............. 358/471

FOREIGN PATENT DOCUMENTS

| JP | 10-336396 | 12/1998 |
| JP | 2000-32244 | 1/2000 |
| JP | A-2002-223339 | 8/2002 |
| JP | A-2002-281237 | 9/2002 |
| JP | 2003-8833 | 1/2003 |
| JP | A-2003-324581 | 11/2003 |
| JP | 2005-33465 | 2/2005 |
| JP | 2005-236788 | 9/2005 |
| JP | 2006108828 | * 4/2006 |
| JP | A-2006-108828 | 4/2006 |

OTHER PUBLICATIONS

Notification of Reason for Refusal dated Feb. 7, 2012 received from the Japanese Patent Office from related Japanese Application No. 2010-070636, together with an English-language translation.

* cited by examiner

*Primary Examiner* — Benny Q Tieu
*Assistant Examiner* — Marcellus Augustin
(74) *Attorney, Agent, or Firm* — Scully, Scott, Murphy & Presser, P.C.

(57) ABSTRACT

An image reading apparatus including: a feeding device; a first reading unit that scans an image of a first surface of the document fed by the feeding device; a second reading unit that scans an image of a second surface of the document fed by the feeding device, wherein the second surface is opposite to the first surface; a first processing unit that processes the image data read by the first reading unit when performing a double-sided reading; a second processing unit that processes the image data read by the second reading unit when performing the double-sided reading, and a control unit that, when a one-sided reading of a following document is performed while one of the processing units is performing a processing of a one-sided reading of a preceding document, controls the other processing unit to perform processing of the one-sided reading of the following document.

6 Claims, 8 Drawing Sheets

FIG. 5

COPY SETTING

PLEASE SELECT A COPY TYPE

⦿ ONE-SIDED READING, ONE-SIDED PRINTING
○ ONE-SIDED READING, DOUBLE-SIDED PRINTING
  DOUBLE-SIDED READING, ONE-SIDED PRINTING
  DOUBLE-SIDED READING, DOUBLE-SIDED PRINTING

SELECT WITH A UP AND DOWN BUTTON    DECIDE WITH A START KEY

IMAGE READING APPARATUS HAVING READING UNITS AND PROCESSING UNITS

CROSS-REFERENCE TO RELATED APPLICATION

This application claims priority from Japanese Patent Application No. 2010-070636 filed on Mar. 25, 2010, the entire subject matter of which is incorporated herein by reference.

BACKGROUND

Technical Field

The present invention relates to an image reading apparatus that feeds a document to perform a double-sided reading. More specifically, the present invention relates to an image reading apparatus having two reading units on a document feeding path wherein one reading unit reads one surface of a document and other reading unit reads the other surface.

In an image reading apparatus performing a double-sided reading while delivering a document, it is known that a related image reading apparatus is configured to read a front-face and a reverse-face of a document by one feeding without reversing the document. For example, a related art discloses an image reading apparatus having two reading units on a document feeding path, wherein one reading unit reads a front-face of a document and the other reading unit reads a reverse-face thereof and the respective reading units have independent processing units corresponding to the reading units, respectively. In addition, the related art discloses that a part of the process, which is to be performed the processing unit of the one reading unit, is performed by the other processing unit, since the processing unit of the other reading unit is unused while the one reading unit is reading one surface.

SUMMARY

However, the above related image reading apparatus has following problems. In other words, the operation of one-sided reading in the image reading apparatus has room for improvement. For example, when both preceding and following documents are to perform one-sided readings and load of the one processing unit is increased due to process the preceding document, it is not possible to start a processing of the following document even though the other processing unit is used. In other words, the processing of the following document may be delayed due to the processing of the preceding document. Even when the other processing unit performs a part of the processing of the preceding document, the process start of the following document is affected by the processing of the preceding document.

The present invention is made to solve the above problems of the related image reading apparatus. An object of the present invention is to provide an image reading apparatus, which includes a plurality of processing units to process an image, improving a one-sided reading operation by effectively using both of the processing units.

An illustrative image reading apparatus of the present invention made of consideration of the above includes, An image reading apparatus including: a feeding device that feeds a document; a first reading unit that scans an image of a first surface of the document fed by the feeding device; a second reading unit that scans an image of a second surface of the document fed by the feeding device, wherein the second surface is opposite to the first surface; a first processing unit that processes the image data read by the first reading unit when performing a double-sided reading; a second processing unit that processes the image data read by the second reading unit when performing the double-sided reading, and a control unit that, when a one-sided reading of a following document is performed while one of the processing units is performing a processing of a one-sided reading of a preceding document, controls the other processing unit, which is not performing the processing of the one-sided reading of the preceding document, to perform processing of the one-sided reading of the following document.

The illustrative image reading apparatus of the present invention can read both sides of a document in one pass by two reading units (first reading unit, second reading unit) and processes the image data, which is read by the respective reading units, by the processing units (first processing unit, second processing unit) corresponding to the respective reading units. The processes, which are performed by the respective processing units, include storage process of the image data and compression process of the image data, for example. When the one-sided reading of the following document is performed while the one processing unit is performing a processing of the one-sided reading of the preceding document, the image reading apparatus of the present invention causes the other processing unit to perform a process of one-sided reading of the following document. At this time, the reading unit that is used for the reading of the following document may be the same as or different from the reading unit that is used for the reading of the preceding document.

In other words, when both the preceding document and the following document are to perform the one-sided reading while the one processing unit is processing the image data of the preceding document, the image reading apparatus of the present invention performs the processing of the image data of the following document by using the unused other processing unit. Thus, it is possible to perform the processing of the following document while performing the processing of the preceding document and, thus, to effectively use both the processing units. In addition, the following document can be proceeded without waiting for the process completion of the preceding document, so that the stagnation of the reading operation can be avoided.

According to the present invention, it is achieved an image reading apparatus, which includes a plurality of processing units to process an image, improving a one-sided reading operation by effectively using both of the processing units.

BRIEF DESCRIPTION OF THE DRAWINGS

FIG. 5 is a view showing an example of a copy setting screen;

DETAILED DESCRIPTION OF ILLUSTRATIVE ASPECTS

Hereinafter, illustrative aspects of an image reading apparatus of the invention will be described with reference to the drawings. In these illustrative aspects is applied to a Multi Function Peripheral (hereinafter referred to as MFP) having a reading function and a printing function.

[First Illustrative Aspect]
[Configuration of MFP]

Figure 1:
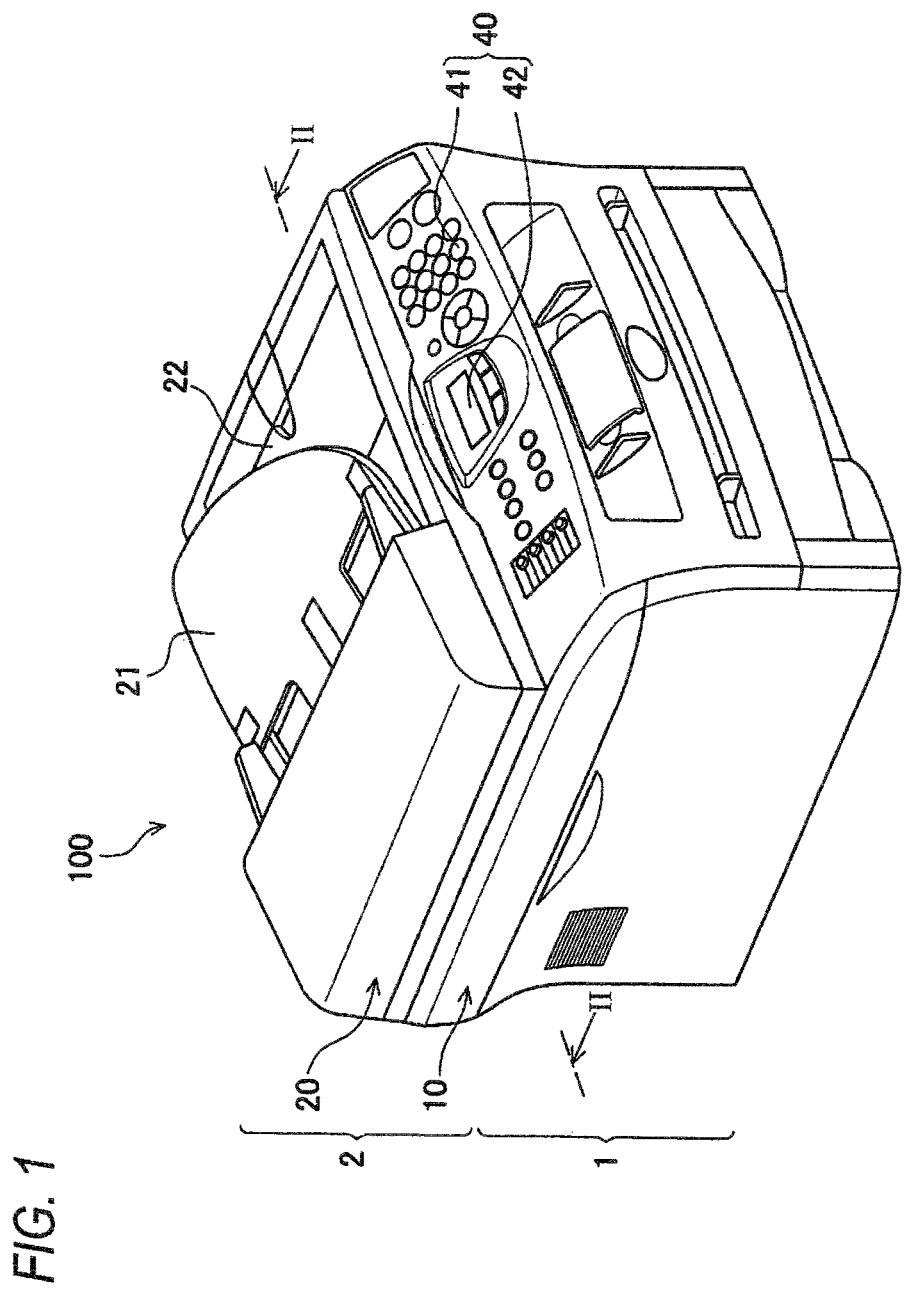
FIG. 1 is a perspective view showing an outward appearance of a Multi-Function Peripheral (hereinafter referred to as MFP) according to a first illustrative aspect.

As shown in FIG. 1, a MFP 100 (an example of an image reading apparatus) of a first illustrative aspect has an image forming unit 1 that prints an image on a sheet and an image reading unit 2 that reads an image of a document. An image forming method of the image forming unit 1 may be an electro-photography method or inkjet method. Meanwhile, the image forming unit may form a color image or only a black-white image. Further, the image forming unit may perform a double-sided printing or only one-sided printing.

The MFP 100 has at its front side an operation panel 40 that includes a button group 41 having a variety of buttons (for example, start key, stop key and ten keys) and a display unit 42 configured by a liquid crystal display. By using the display unit 42 or button group 41, an operation status is displayed or a user performs an input operation.

In addition, the MFP 100 may have a FAX transmission/reception function, a data transmission/reception function with an external information apparatus such as a personal computer and a storing function to an external memory apparatus such as USB memory, in addition to the printing function of the image forming unit 1 and the reading function of the image reading unit 2.

[Configuration of Image Reading Unit]

Figure 2:
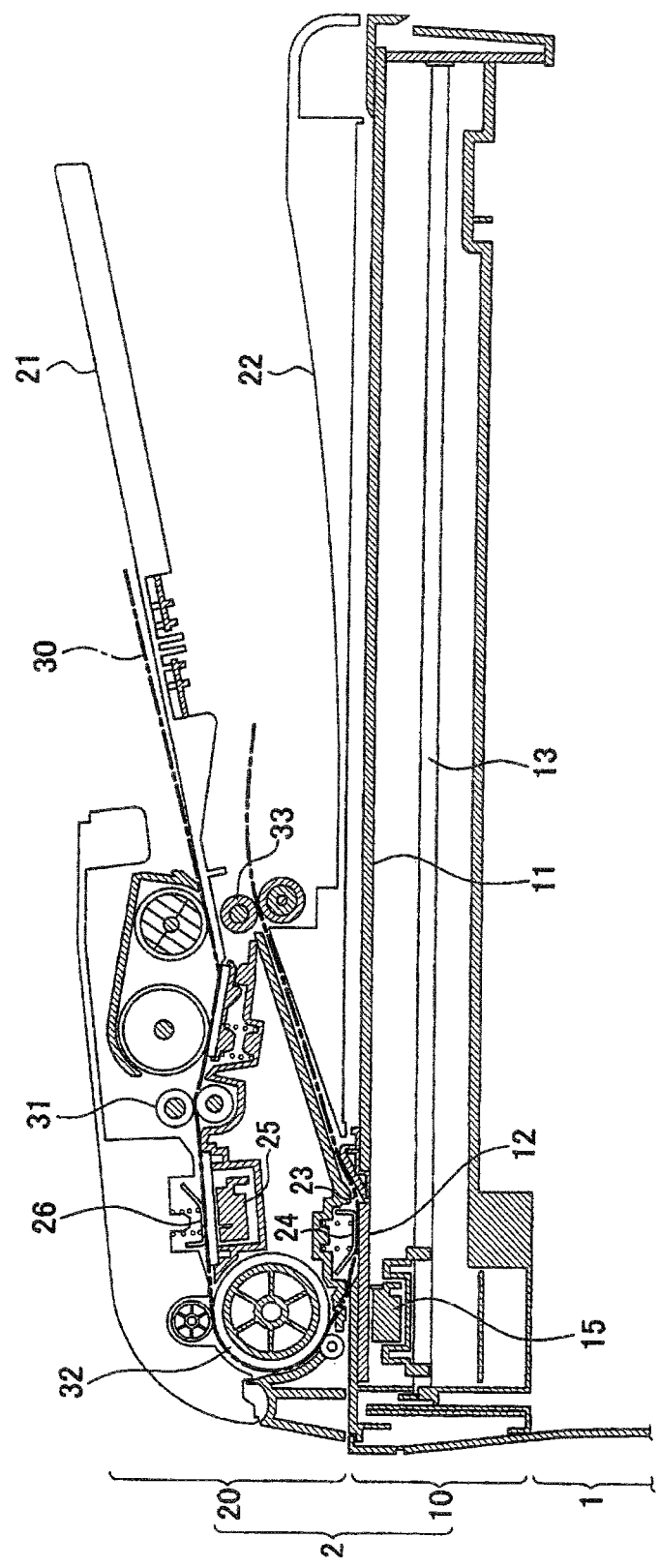
FIG. 2 is a sectional view showing an internal configuration of an image reading unit of the MFP (cross section along a line II-II) shown in FIG. 1.

The configuration of the image reading unit 2 will be described with reference to FIGS. 1 and 2. The image reading unit 2 has a main body unit 10 that reads an image and an Auto Document Feeder 20 (hereinafter referred to as ADF; an example of a feeding device) that automatically feeds a document.

The main body unit 10 has contact glasses 11, 12 at its upper surface. Further, an image sensor 15 (an example of a first reading unit) that scans an image of a document is provided in the main body unit 10 and below the contact glasses 11, 12. The image sensor 15 includes optic devices aligned in a line in a main scanning direction (a direction orthogonal to a document feeding direction, a depth direction of FIG. 2), and the image sensor 15 converts and outputs reflective light from the document into an electric signal. A Contact Image Sensor (CIS) or a Charge Coupled Device (CCD) may be used as the image sensor 15.

The image sensor 15 is slidably supported to a slide shaft 13. The slide shaft 13 extends in a sub-scanning direction (left and right direction of FIG. 2). Both end portions of the slide shaft are fixed to a housing of the main body unit 10. Due to this, the image sensor 15 is possible to move in the left and right direction of FIG. 2.

The ADF 20 is positioned at an upper part of the main body unit 10. One side of the ADF is connected to the main body unit 10 and is rotatable respect to the main body unit 10. Consequently, the ADF 20 is possible to open and close an upper surface of the main body unit 10 and serves as a cover covering the upper surface of the main body unit 10. In addition, the ADF 20 has a document inlet 21, on which documents to be read are placed, and a discharge outlet 22, on which documents are put after reading. To be more specific, the document inlet 21 is arranged above the discharge outlet 22.

Further, the ADF 20 includes a feeding path 30 having an approximate U shape (dashed-dotted line in FIG. 2) that is a document feeding path and connects the document inlet 21 and the discharge outlet 22. In the feeding path 30, a feed roller 31, a main roller 32 and a discharge roller 33 are provided in that order from an upstream side of the document feeding direction.

Also, the ADF 20 has an opening 23 at its lower surface and a document pushing plate 24 is arranged to expose through the opening 23. The document pushing plate 24 is provided between the downstream of the main roller 32 and the upstream of the discharge roller 33 in the document feeding direction, and The document pushing plate 24 faces the contact glass 12 at a state in which the ADF 20 is closed.

The ADF 20 picks up the documents put on the document inlet 21 one at a time by the feed roller 31 and cause the document to U-turns along the main roller 32. Then, the ADF feeds the document to a position facing to the contact glass 12 of the main body unit 10 (hereinafter, referred to as "ADF glass 12"). Specifically, the ADF causes the document to pass between the document pushing plate 24 and the ADF glass 12. Then, the ADF 20 discharges the document to the discharge outlet 22 through the discharge roller 33.

The image reading unit 2 has two reading methods, as a document reading method using the image sensor 15, a flat bed method (document-fixed reading method) and an ADF method (document moving reading method). In the flat bed method, the documents are placed on the contact glass 11 (hereinafter, referred to as "FB glass 11") one by one. At this state, the image sensor 15 is moved in the sub-scanning direction (a direction orthogonal to the main reading direction, the left-right direction of FIG. 2) and an image of the document is read one line by one line in the sub-scanning direction. On the other hand, in the ADF method, the documents are placed on the document inlet 21. Then, the image sensor 15 is moved and fixed to a position opposite to the ADF glass 12. At this state, the document is fed to the position below the document pushing plate 24 and facing the ADF glass 12, by the ADF. At this time, an image of the document is read one line by one line in the sub-reading direction.

Further, the ADF 20 includes an image sensor 25 (an example of a second reading unit) that reads an image of a document and a document pushing plate 26 facing the image sensor 25 in downstream of the feed roller 31 and upstream of the main roller 32 in the document feeding direction. The image sensor 25 and the document pushing plate 26 are arranged so that the document passes therebetween. Similar to the image sensor 15 of the main body unit 10, a CIS or CCD may be applied as the image sensor 25.

The image sensor 25 is arranged at a position at which the image sensor 25 is possible to read the other surface opposite to one surface to be read in the ADF method by the image sensor 15. Accordingly, the image reading unit 2 is possible to read one side of a document by the image sensor 15 in the main body unit 10 and the other side by the image sensor 25 in the ADF 20 in one pass, respectively. In other words, the image reading unit is configured to perform a double-sided reading in one pass. Hereinafter, a side that is read by the image sensor 15 is referred to as "front-face" and the other side that is read by the image sensor 25 is referred to as "reverse-face."

[Electric Configuration of Image Reading Unit]

Figure 3:
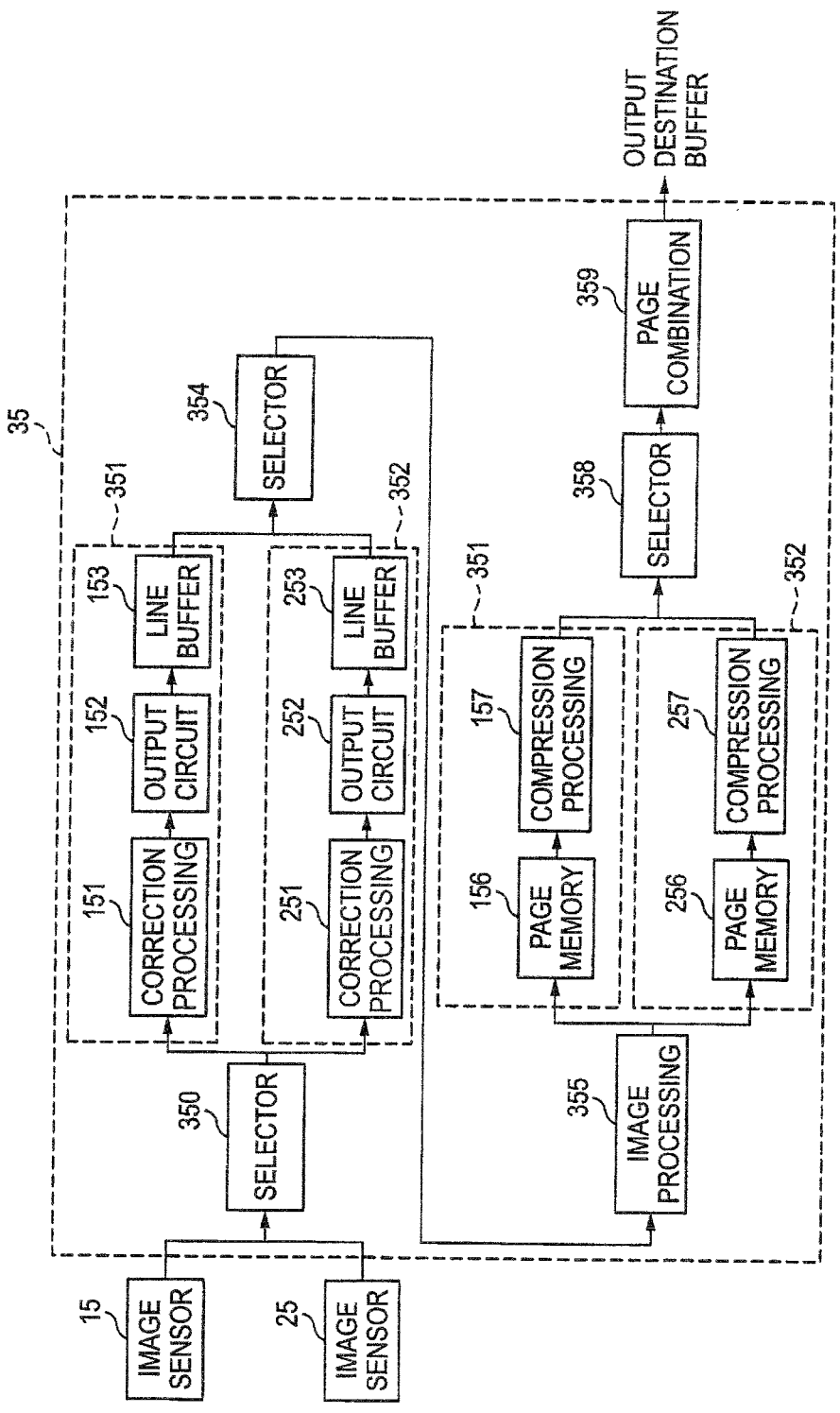
FIG. 3 is a block diagram showing an electric configuration of an image reading unit according to a first illustrative aspect.

Continuously, the electric configuration of the image reading unit 2 will be described. As shown in FIG. 3, the image reading unit 2 has a data processing unit 35 including correction processing units 151 and 251, output circuits 152 and 252, line buffers 153 and 253, selectors 350, 354 and 358 (an example of a switching unit), an image processing unit 355, page memories 156 and 256, compression processing units 157 and 257 and a page combination unit 359.

The correction processing units 151 and 251 perform a variety of correction processes (for example, black correction, white correction, reduction, γ correction and the like). The line buffers 153 and 253 store image data of one or more lines. The image processing unit 355 performs a variety of image processes (color conversion, storing correction, binarization, white sheet determination and the like). The page memories 156 and 256 store image data of one or more pages. The page combination unit 359 arranges orders of the image data of each page or changes an output destination.

In addition, the data processing unit 35 is configured by a front-face processing unit 351 (an example of a first processing unit) that processes image data of a front-face read by the image sensor 15 and a reverse-face processing unit 352 (an example of a second processing unit) that processes image data of a reverse-face read by the image sensor 25.

The front-face processing unit 351 outputs the image data of a front-face, which is output from the image sensor 15, to a buffer of an output destination through the selector 350, the correction processing unit 151, the output circuit 152, the line buffer 153, the selector 354, the image processing unit 355, the page memory 156, the compression processing unit 157, the selector 358 and the page combination unit 359, in that order. The reverse-face processing unit 352 outputs the image data of a reverse-face, which is output from the image sensor 25, to a buffer of an output destination through the selector 350, the correction processing unit 251, the output circuit 252, the line buffer 253, the selector 354, the image processing unit 355, the page memory 256, the compressing processing unit 257, the selector 358 and the page combination unit 359, in that order.

The output destination of the data processing unit 35 is different depending on types of a job. For example, in a copy job, a storing buffer of the image forming unit 1 is to be the output destination. In addition, in a FAX transmission job, a FAX transmission buffer is to be the output destination. Further, in a file storing job to a USB memory, a USB memory connected to the MFP 100 is to be the output destination.

In the front-face processing unit 351 and the reveres face processing unit 352, the image processing unit 355 and the page combination unit 359 are shared. Accordingly, the data processing unit 35 includes the selector 354 at the front of the image processing unit 355. The selector 354 acquires image data for each line from the line buffers 153 and 253. In performing a double-sided reading operation, the selector alternately transfers the image data of a front-face and the image data of a reverse-face to the image processing unit 355. In addition, the data processing unit 35 includes the selector 358 at the front of the page combination unit 359. The selector 358 acquires image data for each line from the compression processing units 157 and 257. When performing a double-sided reading operation, the selector alternately transfers the image data of the front-face and the image data of the reverse-face to the page combination unit 359.

In addition, the data processing unit 35 includes the selector 350, which switches the processing units, at the front of the correction processing units 15 and 251. The selector 350 receives the data from the image sensors 15 or 25 and transfers to the front-face processing unit 351 or the reverse-face processing unit 352. Accordingly, the data processing unit 35 can perform a process in a processing unit that is different from the originally processing unit, as required. In this illustrative aspect, the description of "originally" means that the image data read by the image sensor 15 is processed by the front-face processing unit 351 and the image data read by the image sensor 25 is processed by the reverse-face processing unit 352. In addition, the description of "different from the originally" means that the image data read by the image sensor 15 is processed by the reverse-face processing unit 352 and the image data read by the image sensor 25 is processed by the front-face processing unit 351.

In addition, the configuration of the data processing unit 35 is one example and is not limited to the above. For example, in the above configuration, the image processing unit 355 and the page combination unit 359 are shared. However, the image processing unit and the page combination unit may be independently provided in the front face processing unit 351 and the reverse face processing unit 352. In addition, the line buffers 153 and 253, the page memories 156 and 256, and the compression buffers 158 and 258 may be dedicated memories and a part of a memory that are shared in other process.

[Reading Operations of MFP]

Continuously, the reading operations of the image reading unit 2 of the MFP 100 will be described. As reading operations using the ADF 20, the MFP 100 can perform a double-sided reading operation using the image sensor 15 and the image sensor 25 and a one-sided reading operation using any one of the image sensors. Herein, the one-sided reading in this illustrative aspect means a one-sided reading of a front-face using the image sensor 15.

In the double-sided reading, for a document fed from the document inlet 21, a reverse-face reading is performed by the image sensor 25 and a front-face reading is performed by the image sensor 15. Then, the front-face image data is processed by the front-face processing unit 351 while the reverse-face image data is processed by the reverse-face processing unit 352.

In the one-sided reading, for a document fed from the document inlet 21, a front-face reading is performed by the image sensor 15. Then, the front-face image data is processed by the front-face processing unit 351. In this one-sided reading, the reverse-face processing unit 352 is unused while the front-face processing unit 351 is processing the image data. Therefore, in this illustrative aspect, the reverse-face processing unit 352 is used to perform a process of another job, as required.

[One-Sided Reading Process]

Figure 4:
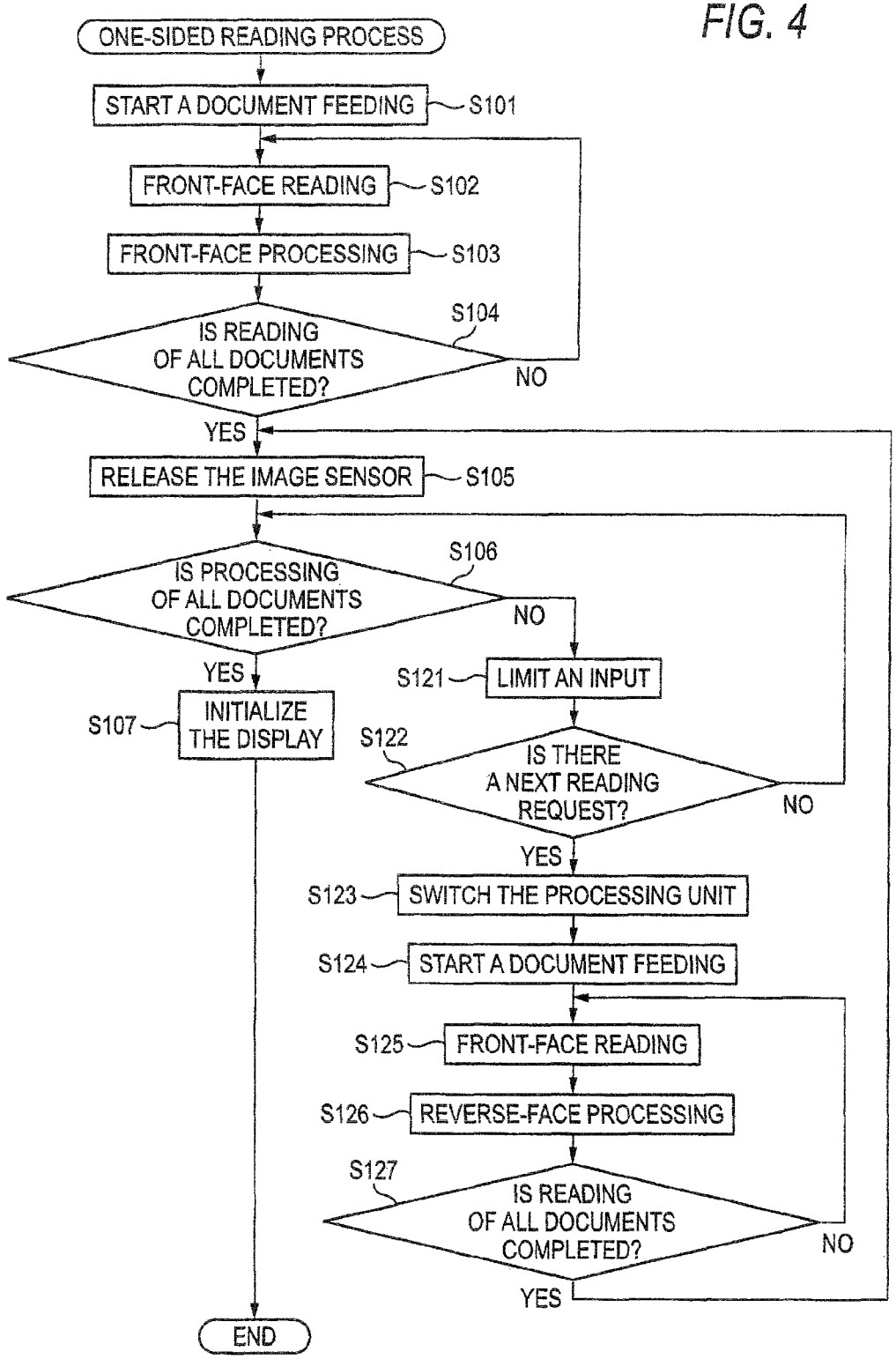
FIG. 4 is a flow chart showing a sequence of a one-sided reading process according to a first illustrative aspect.

Next, a sequence of a one-sided reading process that performs the one-sided reading (an example of a control unit, a switching unit and a limiting unit) will be described with reference to a flow chart of FIG. 4. The one-sided reading process starts when a user sets documents on the document inlet 21 and then inputs a one-sided reading instruction (for example, copy operation or FAX transmission operation).

First, the image sensor 15 is set at a predetermined position, and a document feeding starts (S101). In other words, one of the documents set on the document inlet 21 is picked out and introduced into the feeding path 30. Then, a front-face image of the document is read by the image sensor 15 (S102). Various processes are performed on front-face image data by the front-face processing unit 351 (S103). The processes of S101 to S103 are performed for each of the documents.

Then, it is determined whether reading of all documents is completed (S104). It is possible to determine whether reading of all documents is completed, by detecting that there is no document on the document inlet 21. When there is a document to be read (S104: NO), the image sensor 15 continues the reading.

When reading of all documents is completed (S104: YES), the reading operation by the image sensor 15 is terminated, the position of the image sensor 15 is returned to its initial position and the image sensor 15 is released (S105).

Then, it is determined whether all processing of the documents is completed in the processing unit 351 (S106). In other words, it is determined whether image data of the final document is output. When the process of all documents is completed (S106: YES), the display unit 42 of the operation panel 40 is initialized (S107). After the step of S107, the process is terminated.

In the meantime, when processing of all the documents is not complete (S106: NO), an input to the display unit 42 is limited (S121). In other words, even when reading of all the documents is completed and the image sensor 15 is unused, when the process of all documents is not completed, the front-face processing unit 351 cannot be used. Therefore, an input of an operation that requires both the processing units, such as both-sided reading, is limited. The limiting method may include a method that cause a radio button of an item of a limited object not to be selectable, as a non-display, as shown in FIG. 5. In addition, it may be possible that an item of a limited object itself is not displayed or the item cannot be input (for example, gray out) while displaying.

The situation, in which the determination result in S106 is negative, i.e., the processing of the read image data is not completed (hereinafter, referred to as "processing-stacked state") even when the reading is completed, is caused by bulk printing and a failure of an output destination. In this case, a storing buffer of the output destination is not immediately released and the data processing unit 35 cannot output image data of a following page. Accordingly, the image data of the following page remains in the memory (page memories 156 and 256 or line buffers 153 and 253) of the data processing unit 35. When the following page is a final page, the image sensor 15 is released but the front-face processing unit 351 is not released, so that the processing-stacked state occurs.

As described above, the output destination has factors of the processing-stacked state in many cases. Thus, in S121, the input of job, in which the output destination is the same as a preceding job, may be also limited. For example, when an output destination of a preceding job is set a storing buffer of the image forming unit 1, an job including the printing, such as copy, is limited. By limiting the input of job, in which the output destination is to be same, the front-face processing unit 351 and the reverse-face processing unit 352 operate asynchronously.

After the step of S121, it is determined whether there is a next reading request, i.e., whether a job requiring a reading operation is inputted (S122). When there is no reading request (S122: NO), the process returns to S106. In the meantime, when there is a reading request (S122: YES), the process shifts to S123 and a reading operation of a following job, which is a next job, starts.

In the reading operation of a following job, an input destination of the image data read by the image sensor 15 is switched to the reverse-face processing unit 352 from the front-face processing unit 351 (S123). In other words, an input destination of the selector 350 is switched to the correction processing unit 251.

Then, the image sensor 15 is again set at a predetermined position and a document feeding starts (S124). In other words, one of the documents set on the document inlet 21 is picked out and introduced into the feeding path 30. Then, a front-face of the document is read by the image sensor 15 (S125). Various processes are performed on the front-face image data by the reverse-face processing unit 352 (S126). The processes of S124 to S126 are performed on each of the documents.

Then, it is determined whether reading of all documents is completed (S127). When all documents are not read (S127: NO), the image sensor 15 continues the reading. When reading of all documents is completed (S127: YES), the process returns to S105.

That is, in the one-sided reading process of this illustrative aspect under processing-stacked state, the reverse-face processing unit 352, which is different from the originally processing unit, performs the processing of the following job. Accordingly, the processing of the following job is started without waiting for the process completion of the front-face processing unit 351. As a result, both the front-face processing unit 351 and the reverse-face processing unit 352 are used, so that it is possible to effectively use the processing units. In addition, since a user of the following job does not need to await the completion of the preceding job, the user can conveniently use the apparatus.

[Second Illustrative Aspect]

Next, a one-sided reading process of a second illustrative aspect will be described. In this illustrative aspect, the processing of the following job is performed by the image sensor 25 and the reverse-face processing unit 352, under processing-stacked state. This is different from the first illustrative aspect, in which the same image sensor 15 is used for the preceding job and the following job, under the processing-stacked state.

As described in the first illustrative aspect, the image sensors 15 and 25 can be used together even under the processing-stacked state. Accordingly, in this illustrative aspect, the image sensor 25 and the reverse-face processing unit 352 that is the originally processing unit of the image sensor 25 are used.

Figure 6:
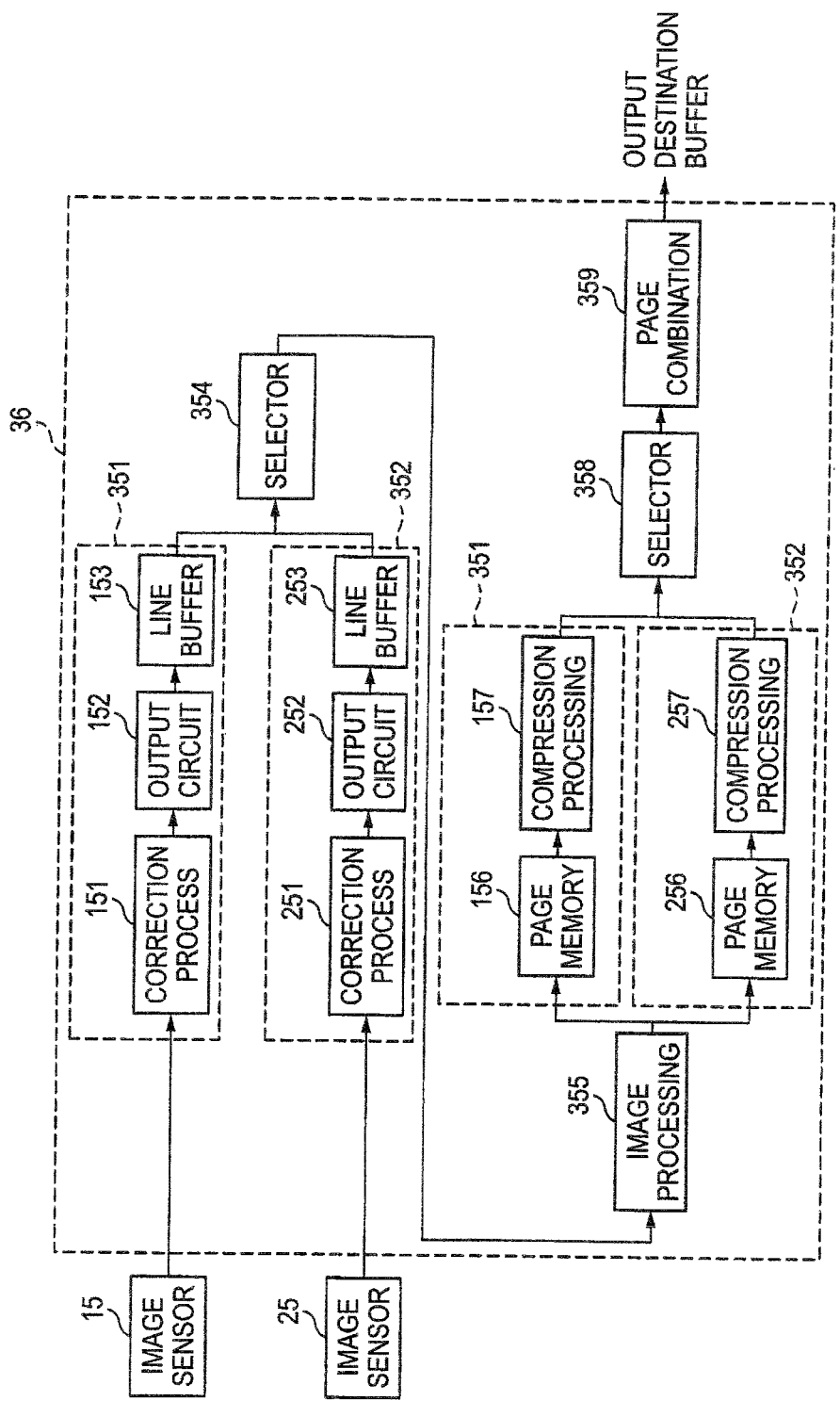
FIG. 6 is a block diagram showing an electric configuration of an image reading unit according to a second illustrative aspect.

As shown in FIG. 6, the image reading unit 2 of this illustrative aspect has a data processing unit 36 including the correction processing units 151 and 251, the output circuits 152 and 252, the line buffers 153 and 253, the selectors 354 and 358, the image processing unit 355, the page memories 156 and 256, the compression processing units 157 and 257, and the page combination unit 359.

The data processing unit 36 includes the selector 350 that is positioned at the front of the correction processing units 151 and 251, compared to the data processing unit 35 (refer to FIG. 3) of the first illustrative aspect. In other words, the data processing unit 36 is not provided at its gateway with means for switching the processing units. Accordingly, it is not possible to select a processing unit that is different from the originally processing unit, at least on a path from the correction processing units to the line buffers. Accordingly, when it is to perform the reading an image using the image sensor 15 under the state, in which the front-face processing unit 351 is processing-stacked, the reading operation is affected by the processing-stacked state.

Figure 7:
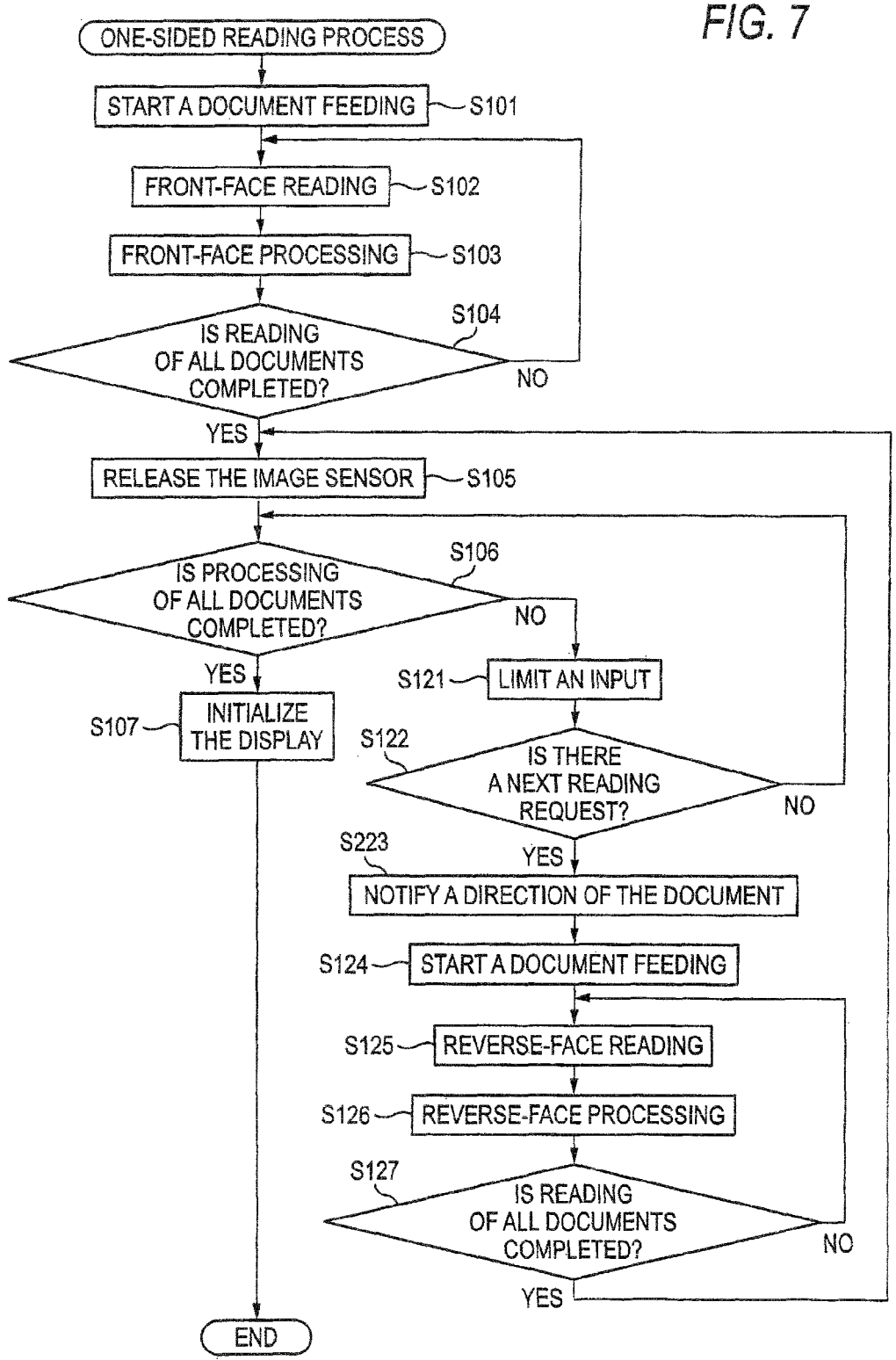
FIG. 7 is a flow chart showing a sequence of a one-sided reading process according to a second illustrative aspect.

Accordingly, in the second illustrative aspect, when the front-face processing unit 351 is processing-stacked state, an image is read by the image sensor 25. FIG. 7 shows a sequence of a one-sided reading process according to a second illustrative aspect. The same processes as the one-sided reading processes of the first illustrative aspect shown in FIG. 4 are indicated by the same reference numerals and the detailed descriptions will be omitted.

Figure 8:
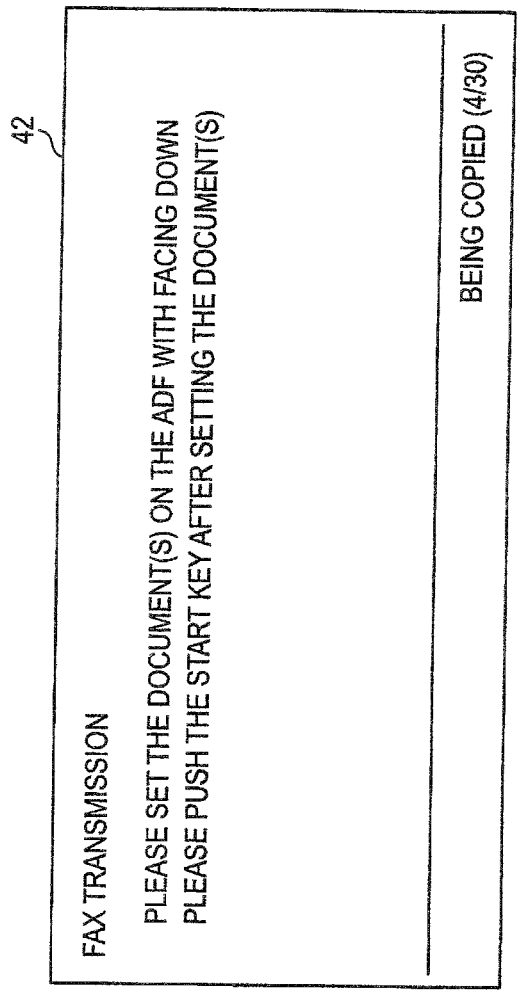
FIG. 8 is a view showing an example of a notifying screen.

In the one-sided reading process of this illustrative aspect, the processing-stacked state regarding the image data read by the image sensor 15 occurs (S106: NO), and when a next reading request is received (S122: YES), a direction of the document is notified (S223). In other words, since the image sensor 25 is used in this illustrative aspect, a reading surface is opposite to that of the preceding job. Therefore, a message that indicates a direction of the document is displayed on the display unit 42, as shown in FIG. 8, so as to enable a user to know a reading surface of the document. Thus, it is will be expected that a miss operation of a user to input a following job will be avoided. In addition, a notification indicating a processing situation of the preceding job is also preferable to a user of the preceding job.

Then, when an instruction to start a reading operation is received, a document feeding starts (S124). Then, a reverse-side of the document is read by the image sensor 25 (S225). The read image data is processed in the reverse-face processing unit 352 (S126).

That is, in the one-sided reading process of the second illustrative aspect under processing-stacked state of the front-face processing unit 351, the image sensor 25 and the reverse-face processing unit 352 perform the reading and the processing of the following job. Accordingly, a processing of a next operation is started without waiting for the process completion of the front-face processing unit 351. Both the front-face processing unit 351 and the reverse-side processing unit 325 are used, so that it is possible to effectively use the processing units, similar to the first illustrative aspect. In addition, since a user of the following job need not await the completion of the preceding job, the user can conveniently use the apparatus.

In the meantime, the configuration having no selector at the entry of the data processing unit 36 is suitable for the one-sided reading process of the second illustrative aspect is suitable, as shown in FIG. 6. However, the invention is not limited thereto. For example, the one-sided reading process of the second illustrative aspect can be also applied to the configuration having the selector 350 at the gateway of the data processing unit 35, as shown in FIG. 3.

As described above, the MFP 100 in the illustrative aspects performs the processing of the following job with the reverse-face processing unit 352, even when both the preceding job and the following job is to perform the one-sided reading and the front-face processing unit 351 is processing the preceding job. Accordingly, it is possible to perform the processing of the following job while performing the processing of the preceding job and to effectively use the processing units 351 and 352. In addition, the processing of the following job can be proceeded without waiting for the process completion of the preceding job, so that the stagnation of the reading operation can be avoided.

In the meantime, the above illustrative aspects are provided just as the examples and not to limit the present invention. Accordingly, the present invention can be variously modified and changed without departing from the scope of the invention. For instance, the present invention is not limited to the MFP and can be applied to an apparatus having an image reading function, such as copier, scanner, FAX and the like.

Further, in the above illustrative aspects, the image sensor 25 is arranged upstream of the image sensor 15, which is used in both the ADF and flat bed reading methods, with respect to the document feeding direction. However, the image sensor 25 may be arranged downstream of the image sensor 15.

Also, in the above illustrative aspects, the processing units are switched for each job. However, the present invention is not limited thereto. For example, the processing units may be switched for each document in the same job so that a document of a page after the processing-stacked state is caused is processed in a processing unit, which is different from the originally processing unit. Further, for example, the processing units may be switched for each document so that an odd-numbered page is processed in the front-face processing unit 351 and an even-numbered page is processed in the reverse-face processing unit 352.

What is claimed is:

1. An image reading apparatus comprising:
a feeding device that feeds a document which belongs to a job; a first reading unit that scans an image of a first surface of the document fed by the feeding device; a second reading unit that scans an image of a second surface of the document fed by the feeding device, wherein the second surface is opposite to the first surface; a first processing unit that processes the image data read by the first reading unit when performing a double-sided reading; a second processing unit that processes the image data read by the second reading unit when performing the double-sided reading; a selector configured to select one of inputting the image data scanned by the first reading unit to the first processing unit and inputting the image data scanned by the first reading unit to the second processing unit, for each of one or more jobs;
a control unit configured to receive an instruction instructing the first reading unit to perform a one-sided reading of a following document, which belongs to a following job, while the first processing unit is performing a processing of a one sided reading of a preceding document, which belongs to a preceding job, and, when the instruction is received, the control unit controlling the second processing unit to perform the processing of the one-sided reading of the following document scanned by the first reading unit; wherein the preceding document is a document belonging to a job that is first performed, wherein the following document is a document belonging to a job that is newly input; wherein an output destination of the processing unit performing the processing of the following document is different from an output destination of the processing unit performing the processing of the preceding document, and wherein the first processing unit and the second processing unit are operated asynchronously.

2. The image reading apparatus according to claim 1, further comprising:
a switching unit that, when the reading unit performing the one-sided reading of the following document is the same as the reading unit performing the one-sided reading of the preceding document, inputs the image data of the following document to the processing unit not performing the processing of the image data of the preceding document.

3. The image reading apparatus according to claim 1, further comprising: a limiting unit that, when a job of the following document is input, limits an input of a job having an output destination that is the same as the output destination of the processing unit performing the processing of the preceding document.

4. The image reading apparatus according to claim 1, further comprising:
a second limiting unit that, when a job of the following document is input, limits an input of an operation that performs a double-sided reading.

5. The image reading apparatus according to claims 1, wherein the first processing unit and the second processing unit perform a storage process of the image data and a compression process of the image data.

6. An image reading apparatus comprising: a feeding device that feeds a document; a first reading unit that scans an image of a first surface of the document fed by the feeding device; a second reading unit that scans an image of a second surface of the document fed by the feeding device, wherein the second surface is opposite to the first surface; a first processing unit that processes the image data read by the first reading unit when performing a double-sided reading;

a second processing unit that processes the image data read by the second reading unit when performing the double-sided reading, and a control unit that, when a one-sided reading of a following document is performed by the second reading unit while one of the processing units is performing a processing of a one-sided reading of a preceding document, the one-sided reading of the preceding document having been performed by the first reading unit, controls the other processing unit, which is not performing the processing of the one-sided reading of the preceding document, to perform processing of the one-sided reading of the following document; wherein the preceding document is a document belonging to a job that is first performed, wherein the following document is a document belonging to a job that is newly input; wherein an output destination of the processing unit performing the processing of the following document is different from an output destination of the processing unit performing the processing of the preceding document, and wherein the first processing unit and the second processing unit are operated asynchronously.

* * * * *